(12) United States Patent
Campolo et al.

(10) Patent No.: US 9,199,734 B2
(45) Date of Patent: Dec. 1, 2015

(54) MOTORISED DEVICE AND METHOD OF MOVING THE DEVICE

(71) Applicant: NANYANG TECHNOLOGICAL UNIVERSITY, Singapore (SG)

(72) Inventors: Domenico Campolo, Singapore (SG); Gih Keong Lau, Singapore (SG); Muhammad Azhar, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 204 days.

(21) Appl. No.: 14/014,921

(22) Filed: Aug. 30, 2013

(65) Prior Publication Data

US 2014/0061379 A1    Mar. 6, 2014

Related U.S. Application Data

(60) Provisional application No. 61/695,074, filed on Aug. 30, 2012.

(51) Int. Cl.
*B64C 39/02* (2006.01)
*B64C 33/02* (2006.01)

(52) U.S. Cl.
CPC ............... *B64C 39/028* (2013.01); *B64C 33/02* (2013.01)

(58) Field of Classification Search
CPC ............................. B64C 39/028; B64C 33/02
USPC ............................ 244/11, 9, 22, 72; 446/35
See application file for complete search history.

(56) References Cited

U.S. PATENT DOCUMENTS

| | | | |
|---|---|---|---|
| 7,204,455 B2 * | 4/2007 | Sinclair | 244/72 |
| 2001/0019088 A1 * | 9/2001 | Smith | 244/17.13 |
| 2003/0226933 A1 * | 12/2003 | Richard | 244/11 |
| 2004/0155145 A1 * | 8/2004 | Ohta et al. | 244/72 |
| 2007/0205322 A1 * | 9/2007 | Liao | 244/22 |
| 2007/0210207 A1 * | 9/2007 | Liao | 244/22 |
| 2008/0251632 A1 * | 10/2008 | Kim et al. | 244/22 |
| 2010/0308160 A1 * | 12/2010 | Keennon et al. | 244/22 |

* cited by examiner

*Primary Examiner* — Justin Benedik
(74) *Attorney, Agent, or Firm* — Greenblum & Bernstein, P.L.C.

(57) ABSTRACT

A motorized device arranged to move using cyclic motion is disclosed. The device includes a motorized means; at least one limb coupled to the motorized means, and configured to be driven by the motorized means for moving the device; and a resilient biasing means coupled to the at least one limb to further drive the at least one limb using mechanical resonance. A related method of moving the motorized device is also disclosed.

17 Claims, 19 Drawing Sheets

| model | weight grams | $V_0$ V | $\omega_0$ rad/sec | $T_{stall}$ mNm | $P_{max}$ mW | $I_0$ mA | $I_{stall}$ mA | $K_t$ mNm/A | $K_v$ C/s | $k_p$ mNm-sec/rad |
|---|---|---|---|---|---|---|---|---|---|---|
| 1 | 104-001 | 0.5 | 3 | 5236 | 0.09 | 39 | 10 | 70 | 0.4 | 42.9 | 13.1 |
| 2 | 104-002 | 0.8 | 1.3 | 3037 | 0.08 | 30 | 14 | 90 | 0.4 | 14.4 | 20.5 |
| 3 | 106-001 | 1.4 | 1.3 | 2513 | 0.14 | 88 | 30 | 340 | 0.4 | 3.7 | 47.7 |
| 4 | 107-001 | 2.4 | 1.5 | 994.8 | 0.25 | 62 | 20 | 170 | 1.5 | 8.8 | 29.6 |
| 5 | 108-004 | 3.7 | 3 | 1885 | 0.93 | 438 | 50 | 880 | 1.6 | 5 | 41.1 |
| 6 | 108-005 | 2.5 | 4 | 1885 | 0.73 | 289 | 40 | 450 | 1.6 (1.5*) | 6.7 (8.3*) | 39.0 |
| 7 | 110-001 | 3 | 3 | 1623.1 | 0.5 | 203 | 40 | 300 | 1.2 | 10 | 41.1 |
| 8 | 110-002 | 3.7 | 1.5 | 1361.4 | 0.58 | 197 | 70 | 730 | 0.8 | 2 | 39.8 |
| 9 | 110-003 | 4.9 | 1.3 | 994.6 | 0.37 | 92 | 40 | 300 | 0.9 | 3.3 | 38.1 |
| 10 | 112-001 | 8 | 2.4 | 1675.5 | 1.55 | 640 | 150 | 1250 | 1.2 | 1.9 | 111 |

(*) actual values as measured from a specific 108-005 model

Figure 4

MOTORISED DEVICE AND METHOD OF MOVING THE DEVICE

CLAIM FOR PRIORITY

This application claims the priority benefit of U.S. Provisional Application No. 61/695,074, filed Aug. 30, 2012, the contents of which is expressly incorporated by reference in its entirety.

FIELD & BACKGROUND

The present invention relates to a motorised device arranged to move using cyclic motion, and a method of moving thereof. More particularly, but not exclusively, it relates to a micro aerial device.

Recent years have witnessed an increase of research efforts in what is generally referred to as biomimetic robotics. Attracted by the unmatched performance of living systems, roboticists have started applying design principles drawing inspiration from biological evidence. In particular, the agility and maneuverability of living flyers in the air have inspired the development of an increasing number of so-called micro aerial vehicles (MAVs). Besides bio-inspired sensing capabilities and neuro-inspired forms of controllers, there has been a technological push towards the development of biomimetic forms of propulsion, with particular emphasis on flapping wings. Flapping locomotion is superior to other forms of propulsions especially at lower speeds. Unparalleled by man-made vehicles, animals such birds, bats, insects etc are in fact capable of fast forward motion as well as hovering, which is considered one of the most energetically challenging forms of locomotion, since it cannot exploit the accumulated kinetic energy of the body as in forward swimming or flying.

Efficient power usage is fundamental for the development of flapping propellers. One of the limits to flapping propulsion, also faced by living systems especially at larger sizes, is represented by the inertia of the wings. The need to periodically accelerate or decelerate the inertia of the appendices poses serious constraints to the flapping modality. Although the primary interest is doing work against the air, as this directly translates into production of lift and thrust forces, it is not uncommon that accelerating or decelerating wings at relatively high frequencies might require much larger inertial torques than damping ones. This would lead to oversized muscles (and actuators for artificial systems), not to mention other related problems that are known in the art.

One object of the present invention is therefore to address at least one of the problems of the prior art and/or to provide a choice that is useful in the art.

SUMMARY

There is provided a motorised device arranged to move using cyclic motion. The device comprises at least two DC motors; at least one limb coupled to the at least two DC motors, and configured to be driven by the at least two DC motors for moving the device; and a resilient biasing means coupled to the at least one limb to further drive the at least one limb using mechanical resonance. The resilient biasing means may be at least one of, for example, helical spring, nylon string, torsion spring and so forth.

The motorised device may include a micro aerial device and the at least one limb may include two wings cooperatively configured for flapping to generate lift. The two wings may be in a coplanar arrangement and arranged in respective planes.

The at least one limb may include two pairs of wings cooperatively configured for flapping to generate lift, each pair of wings being in a respective coplanar arrangement and configured to be independently driven by a corresponding of the at least two DC motors.

Preferably, the wings are configured to flap at a frequency range of between approximately 20 Hz to 40 Hz.

It is preferable that each wing is configured to have a maximum wing stroke of approximately ±60 degrees.

Preferably, the device may further comprise a computing device in wireless communication with the motorised device, wherein the computing device is configured to provide motion-tracking and real-time stabilisation/control commands to the motorised device.

The resistive impedance of the at least two DC motors may be matched with the mechanical resistance generated by the at least one limb.

The at least two DC motors may preferably be configured to be collectively operable using a single driver or configured to be independently operable using respective drivers to enable different limb kinematics.

There is also provided a micro aerial device arranged to move using cyclic motion, the device comprising at least two DC motors; at least one fin coupled to the at least two DC motors, and configured to be driven by the at least two DC motors for moving the device; and a resilient biasing means coupled to the at least one fin to further drive the at least one fin using mechanical resonance.

Finally, there is provided a method of moving a motorised device using cyclic motion, the device including at least two DC motors, at least one limb coupled to the motorised means, and a resilient biasing means coupled to the at least one limb. The method comprises driving the at least one limb using the at least two DC motors to move the device; and further driving the at least one limb using mechanical resonance of the resilient biasing means.

BRIEF DESCRIPTION OF THE DRAWINGS

Embodiments of the invention are disclosed hereinafter with reference to the accompanying drawings, in which:

FIG. 4 is a Table showing motor parameters characterising various DC motors from Precision Microdrives Ltd of United Kingdom;

DETAILED DESCRIPTION OF PREFERRED EMBODIMENTS

Figure 1:
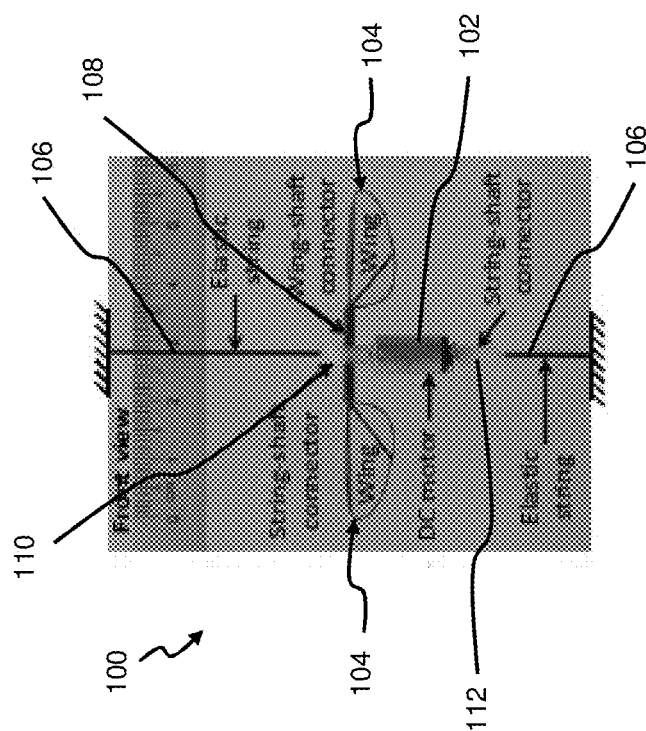
FIG. 1 shows a front elevation view of a motorised device, according to a first embodiment of the present invention.

A motorised device 100, as shown in FIG. 1, configured to move (in an environment) using cyclic motion is disclosed, according to a first embodiment. It is to be appreciated that the motorised device 100 is hummingbird-sized (i.e. between about 10 grams to 20 grams), and in this instance, is also known as a micro aerial vehicle (MAV) to skilled persons. Particularly, the motorised device 100 comprises a motorised means 102, at least one limb 104, and a resilient biasing means 106. In this case, the motorised means 102 is realised using a DC motor 102, and the selection of an appropriate one to pair with the at least one limb 104 will be elaborated in subsequent sections below. Also, it is to be understood from hereon, references to the DC motor 102 includes a reference to the motorised means 102, unless otherwise explicitly stated. The motorised means 102 could be also powered by an independent energy source (not shown) installed onboard the motorised device 100. In this case, lithium-ion batteries (e.g. from Powerstream Inc. of Ontario, Canada) can be utilised as the independent energy source.

Further, in this instance, the at least one limb 104 is realised as a pair of artificial wings 104 configured to be driven by the motorised means 102, by specifically being arranged to implement wing reciprocating (i.e. back and forth) motions when driven in order to generate aerodynamic forces (e.g. lift and drag forces) that enable the motorised device 100 to be airborne (i.e. the environment). Also, the pair of artificial wings 104 is in a coplanar arrangement, and hence moves collectively as a single unit when driven by the motorised means 102. It is also to be understood from hereon, references to the artificial wings 104 (whether singularly or in plurality) include a reference to the at least one limb 104, unless otherwise explicitly stated.

Figure 2B:
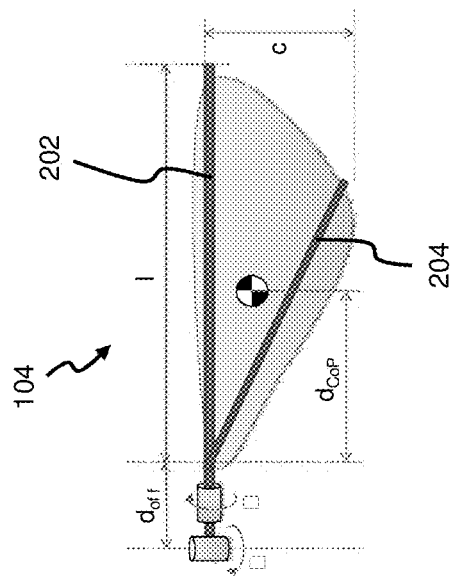
FIGS. 2a and 2b show respective views of an artificial wing used in the motorised device of FIG. 1.
Figure 2A:
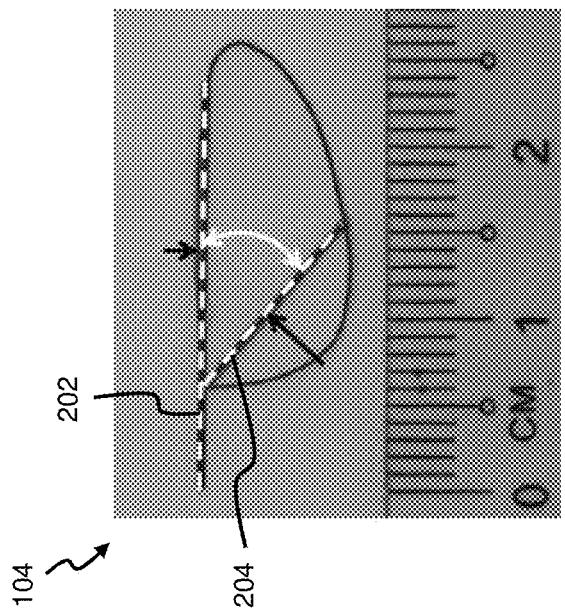

Further, each artificial wing 104, as shown in FIG. 2a, is formed from an elemental structure comprising a leading edge vein 202 and a crossing vein 204 arranged at 40 degrees relative to the leading edge vein 202 to ensure rigidity of the artificial wing. The leading edge vein 202 and crossing vein 204 is made of suitable materials known to skilled persons (e.g. carbon fiber rods). Once formed, the elemental structure is then covered with a suitable membrane (e.g. cellulose acetate film) to form a wing membrane of the artificial wing 104. It is to be appreciated that the cross-section profile of the wing membrane is substantially a flat plate.

In addition, each artificial wing 104 is adapted for passive wing rotation, as shown in FIG. 2b. More specifically, optimal geometry for the artificial wing 104 (i.e. in terms of wingspan/chord length and offset from center of rotation) is adopted to induce desired 2D wing kinematics in relation to the DC motor 104, and elastic element dynamics of the resilient biasing means 106. Each artificial wing 104 is arranged to be plugged via one end of the leading edge vein 202 to into respective opposing ends of a hollow wing-shaft connector 108, and the (longitudinal axis of the) hollow wing-shaft connector 108 is arranged transverse to (the longitudinal axis of) an upper string-shaft connector 110 attached to the DC motor 104, such that the hollow wing-shaft connector 108 laterally pierces the upper string-shaft connector 110. Of course, there is also a lower string-shaft connector 112 attached to the DC motor 104, and to be elaborated below.

In relation to the resilient biasing means 106, in this case, it is implemented using nylon strings 106 that are held in tension, but it is to be understood that any type of suitable torsion springs that are guaranteed linearity of the stiffness coefficient for relatively large angular displacements may also be adopted for use by the motorised device 100. It is to be understood from hereon, references to the nylon strings 106 include a reference to the resilient biasing means 106, unless otherwise explicitly stated. The implementation using nylon strings 106 will be described in greater detail below. But more importantly, the resilient biasing means 106 is specifically devised to be coupled (via any suitable ways) to the pair of artificial wings 104 to further drive the artificial wings 104 using mechanical resonance (i.e. via elastic transmission). For example, the resilient biasing means 106 may be coupled to the at least one limb 104 by being attached to a rotor of the DC motor 104, or being attached between a rotor shaft and a stator of the DC motor 104 in another alternative implementation. Indeed, other ways envisageable by the skilled person for coupling the resilient biasing means 106 to the artificial wings 104 are possible. By virtue of the above arrangement, the DC motor then undergoes a reciprocating (i.e. back and forth) rather than rotary motion. It is to be appreciated that this use of a direct transmission via the resilient biasing means 106 ensures that the sole nonlinearity in the motorised device 100 is due to only aerodynamic damping.

From hereon, the rest of the description are structured as follows: a simplified aerodynamic model for modeling the motorised device 100 is introduced, which allows the nonlinearities of aerodynamic damping to be taken into account, without delving into complex fluid dynamics approaches. Based on a biological observation that wing motion in living flyers (e.g. insects) is 'quasi-sinusoidal', a simplified analysis is applied accordingly to represent aerodynamic damping as a (nonlinear) equivalent electrical impedance. Maximum power transfer arguments are then presented for selecting a suitable DC motor, based on impedance matching.

Next, development of a prototype of the motorised device 100 is described, providing implementation details which avoid the introduction of unnecessary nonlinearities in the system dynamics, besides the inherent nonlinear aerodynamic damping. Characterisation of the motorised device 100 is then performed to derive experimental data, which are compared against related results obtained from simulation of a system modeling the motorised device 100, in which the simulation results take into account the full dynamics of the motorised device 100. Finally, a compact implementation of the motorised device 100 as a suitable candidate for a future, autonomous micro-aerial vehicle is presented and shown.

I. Models and Simplified Analysis at Quasi-Sinusoidal Regime

A. Wind Aerodynamics: Nonlinear Damping

When a wing (generally speaking) moves in a surrounding fluid (e.g. air), energy is transferred to the fluid and reaction forces arise. In principle, the force distribution on the wing may be derived from the Navier-Stokes equations. In practice, the accuracy of the solutions to the above stated problem is guaranteed only by numerical approaches. However, when accuracy requirements are not stringent, reliable simplifications models can be used, which are based on the assumption of steady or quasi-steady flow. Such models are based on quasi-steady blade element analysis, whereby the wing is assumed to be divided into a finite number of strips and each strip is independently analysed. For a wing of length R, blade element analysis considers infinitesimal strips of the wing at a distance r from the fulcrum and of infinitesimal area c(r) dr, where c(r) is the wing chord which determines the geometric profile of the wing. For each strip of the wing under consideration, the instantaneous drag torque is defined as:

$$dB = \frac{1}{2}\rho C_D r(r \cdot \omega)^2 \text{ sign}(\omega) c(r) dr \quad (1)$$

where $\rho$ is the density of the fluid surrounding the wing (for air, $\rho=1.2$ Kg/m$^3$), $C_D$ is the adimensional drag coefficient, and $r \cdot \omega$ is the linear velocity of the particular strip. It is to be appreciated that since $C_D$ depends on the angle of attack (i.e. inclination of the wing or fin with respect to a velocity of the fluid), therefore is in principle time dependent, and can be averaged out throughout the motion.

For a given wing, equation (1) can be integrated over the whole wing length, leading to:

$$B(\omega) = \int_0^R dB = B_0 \omega^2 \text{ sign}(\omega) \quad (2)$$

where the torque damping coefficient $B_0$ is defined as:

$$B_0 = \frac{1}{2}\rho C_D \int_0^R r^3 c(r) dr \quad (3)$$

As aforementioned, this embodiment is devised with reference to hummingbirds in mind, where it is known that wings of certain hummingbirds flap at approximately 35 Hz. The artificial wing 104 used in obtaining experimental data is shown in FIG. 2a, as described previously. Fabrication details for the artificial wings 104 will be provided in more detail below. Based on the geometry and material properties of the artificial wings 104 of FIG. 2a, the torque damping coefficient $B_0$ in equation (3) and the inertia $J_w$ for a single artificial wing 104 (but note that a pair of artificial wings 104, as per this embodiment, are used in the experiments) are numerically evaluated to give:

$$B_0 = 1.32 \cdot 10^{-9} Kgm^2 rad^{-2} \quad (4)$$

$$J_w = 9.53 \cdot 10^{-9} Kgm^2 \quad (5)$$

B. Analysis at Quasi-Sinusoidal Regime

Based on related prior work and known biological observations, it is to be appreciated that quasi-sinusoidal regime assumptions allow estimation of power requirements at steady state for a given stroke angle $\pm\theta_0$ and a given flapping frequency $f_0$. Further, wing kinematics (i.e. angular position, velocity and acceleration) can be expressed as:

$$\tilde{\theta} = \theta_0 \sin(2\pi f_0 t) \quad (6)$$

$$\tilde{\omega} = \Omega_0 \cos(2\pi f_0 t) \quad (7)$$

$$\tilde{\alpha} = -2\pi f_0 \Omega_0 \sin(2\pi f_0 t) \quad (8)$$

where $\Omega_0$ represents the angular speed amplitude which is defined as:

$$\Omega_0 := 2\pi f_0 \theta_0 \quad (9)$$

By introducing a concept of equivalent proportional damping, the power dissipated against drag can be estimated as:

$$\tilde{P}_{drag} = \tilde{B}(\tilde{\omega})\tilde{\omega} = B_0 \frac{8}{3\pi} \Omega_0 \tilde{\omega}^2 \quad (10)$$

where a peak power (being equivalent to the power amplitude) is defined as:

$$P_{drag}|\tilde{P}_{drag}| = B_0 \frac{8}{3\pi} \Omega_0^3 \quad (11)$$

It is also to be appreciated that (in relation to the equivalent proportional damping) for a particular amplitude of a sinusoidal trajectory, an equivalent linear damper dissipates the same power as the nonlinear damper described in equation (2).

II. DC Motor Selection Via Impedance Matching

Unlike gliding, hovering is very challenging from an actuator's perspective. The actuator refers to the DC motor 104, here for this embodiment. For wing-strokes of ±60 degrees, the inertial to aerodynamic torque ratio, for quasi-sinusoidal motions, can be quickly estimated as:

$$\frac{\tilde{\tau}_{inertial}}{\tilde{\tau}_{aero}} = \frac{J\omega(2\pi f_0)^2 \theta_0}{B_0(2\pi f_0 \theta_0)^2} = \frac{J_w}{B_0 \theta_0} \approx 6.9 \quad (12)$$

Therefore, torques required to accelerate or decelerate the wing inertia are much larger than aerodynamic torques. For an actuator to drive the artificial wings 104, the minimum requirement is to produce at least the same amount of power that will be dissipated by the aerodynamic damping. If the actuator is also required to handle the peak inertial torques (e.g. about five times higher than the aerodynamic torques) then the selection of a suitable DC motor (to be adopted for the motorised device 100) would necessarily lead to an oversized actuator, i.e. with a rated power which is much larger than the minimum aerodynamic requirements.

A. Simplified Analysis at Quasi-Sinusoidal Regime

Figure 3:
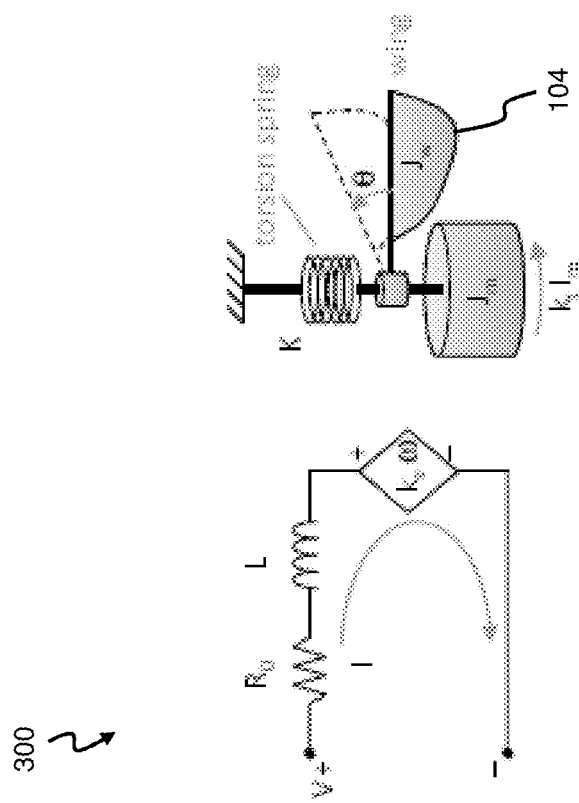
FIG. 3 shows a schematic diagram of an electro-mechanical model of a DC motor driving a wing in parallel to a torsion spring, in which the model is used to model the dynamics of the motorised device of FIG. 1.

In the case of quasi-sinusoidal kinematics, as for hummingbirds, exploiting resonance using a resilient biasing means 106, such as a spring, to mechanically resonate with the wing inertia at the desired frequency ($f_0$) can be extremely advantageous, not to mention also in presence of nonlinearities such as aerodynamic damping. To this end, consider a mechanical system (used to model the motorised device 100) comprising an artificial wing 104 with inertia $J_w$, subjected to aerodynamic damping $B(\omega)$, attached to a torsion spring with rotational stiffness K, and directly driven by the DC motor 102 exerting a torque $\tau_m$. Also, the mechanical system is shown in the schematic diagram 300 of FIG. 3, where the armature equations are coupled to the mechanical system via the back-electromotive force ($K_e\omega$) and via the electromagnetic torque ($K_tI$). More specifically, the described system can be defined by the following second order equation:

$$J_w\alpha + B(\omega) + K\theta = \tau_m \quad (13)$$

The electro-mechanical model of the DC motor 104 driving the mechanical system characterised by equation (13) can be expressed as:

$$\begin{cases} V = R_0 I = k_a \omega \\ k_a I = J_{tot}\alpha + (b_0 + B_0\omega\,\text{sign}(\omega))\omega + K\theta \end{cases} \quad (14)$$

where V and I are, respectively, the voltage and current at the motor terminals; $\omega$ and $\alpha$ are, respectively, the angular speed and the angular acceleration of the rotor; $R_0$ is the electrical resistance of the armature; $k_a$ is the armature constant; $b_0$ is the damping constant due to the internal friction (i.e. of the motor bearings); $J_{tot}:=J_m+2\times J_w$ accounts for both rotor inertia $J_m$ and wings inertia $2\times J_w$. It is also to be appreciated that, in this instance, the armature inductance is neglected as the electrical dynamics are much faster than mechanical dynamics.

Resonance can be set to occur at the frequency $f_0$ by selecting the appropriate value K for rotational stiffness, which is expressed as:

$$K = (2\pi f_0)^2 J_{tot} \quad (15)$$

then at sinusoidal regime, by making use of equations (6) to (8), the inertial torque and the elastic torque will balance one another as per: $J_{tot}\alpha + K\theta = 0$.

At resonance, sinusoidal voltage and current inputs of amplitude, respectively, $V_0$ and $I_0$ can be expressed as functions of $\Omega_0$ as follows:

$$\begin{cases} V_0 = R_0 k_a^{-1}\left(b_0 + \dfrac{8}{3\pi}B_0\Omega_0\right)\Omega_0 + k_a\Omega_0 \\ I_0 = k_a^{-1}\left(b_0 + \dfrac{8}{3\pi}B_0\Omega_0\right)\Omega_0 \end{cases} \quad (16)$$

Of course, for a given kinematics $\Omega_0$, theoretical values for the amplitude of the voltage and current can always be derived from equation (16) but these might exceed the rated limits. Based on a known related method, a power analysis is developed to allow appropriate DC motors (for use with the motorised device 100) to be graphically selected.

B. Power Estimates

The instantaneous mechanical power balance is obtainable from the set of equations (16) and can be rewritten to highlight the power dissipated against mechanical damping (i.e. input electrical power minus electrical losses) as:

$$\tilde{P}_{mech} \stackrel{def}{=} \tilde{V}\tilde{I} - R_0\tilde{I}^2 = \frac{1}{\eta_x}\tilde{P}_{drag} \quad (17)$$

where $\tilde{P}_{drag}$ is defined in equation (10) and the efficiency $\eta_x$ is expressed as:

$$\eta_x = \left(1 + \dfrac{b_0}{\dfrac{8}{3\pi}B_0\Omega_0}\right)^{-1} \quad (18)$$

to take into account the mechanical power dissipated against friction instead of aerodynamic drag.

The maximum power transfer theorem for linear networks states that, for a given nominal input voltage, the maximum mechanical power delivered to a mechanical load equals the electrical losses, leading to a maximum of 50% efficiency which can be achieved only on fulfilling an impedance matching condition. It is to be appreciated that a similar result can be derived in this instance. The instantaneous mechanical power balance of equation (17) can accordingly be written as:

$$\eta_x \frac{1}{2}\frac{V_0^2}{2R_0} = \frac{1}{\mu}P_{drag} \quad (19)$$

where $P_{drag}$ is defined in equation (11), whereas $R_{mech}$ is the equivalent mechanical resistance, and $\mu$ is the impedance mismatch factor, being respectively defined as:

$$R_{mech} := \dfrac{\eta_x K_a^2}{\dfrac{8}{3\pi}B_0\Omega_0} \quad (20)$$

$$\mu := 4\dfrac{R_{mech}/R_0}{(1 + R_{mech}/R_0)^2} \quad (21)$$

Note that $0 < \mu \leq 1$ for all $R_0$; $R_{mech} > 0$, and also that $\mu = 1$ if and only if $R_0 = R_{mech}$, which means that the power dissipated across $R_{mech}$ equals the power dissipated across $R_0$, i.e. a 50% efficiency. In the best case scenario (i.e. under the impedance matching condition, where $R_{mech} = R_0$) the total input power is $\tilde{V}^2/(2R_0)$ and only half of it can be transferred to the mechanical load. It is also to be highlighted that a specific advantage that can be obtained from equation (18) is that it provides a useful interpretation in terms of power, and leads to a graphical representation that is helpful for selection of a suitable DC motor, as will be apparent from subsequent description below.

C. Impedance Matching and Motor Selection

Each term in equation (19) is a function of the desired kinematics $\Omega_0$, as defined in equation (9) based on a desired stroke angle $\theta_0$ and a desired flapping frequency $f_0$. The power $P_{drag}$ to be dissipated against aerodynamic damping is the minimum amount that the DC motor 102 needs to be able to deliver. In fact, the required power to be delivered could be even larger in case of impedance mismatch $\mu < 1$, as indicated by the right-hand side of equation (19). On the other hand, the left-hand side of equation (19) represents the available power, corresponding to the maximum power that can be transferred to an optimally matched load, i.e. one half of $V_0^2/(2R_0)$, further reduced by inefficiencies due to friction ($\eta_x$).

The right-hand side of equation (19) does not depend on motor parameters and only reflects requirements of the load (i.e. the artificial wings 104). The left-hand side of equation (19) is motor-specific and, for each $\Omega_0$, it is possible to determine whether the operating conditions exceed any given limit. Consider the pair of artificial wings 104, each as shown in FIG. 2a, a mechanical inertia $J_W=2\times9.53\cdot10^{-9}$ Kg m$^2$ and aerodynamic damping $B_0=2\times1.32\cdot10^{-9}$ Kg m$^2$ rad$^{-2}$ can be estimated, as in equations (4) and (5). For a desired stroke-angle $\theta_0=\pm60$ degrees and flapping frequency $f_0=35$ Hz, the speed amplitude is determined to be $\Omega_0=2\pi f_0\theta_0=230.3$ rad/sec.

In selecting possible actuators for use, this embodiment focuses on commercially available, low-cost DC motors. Although such DC motors are widely available, e.g. for the toy industry, very few manufacturers provide detailed electromechanical characteristics. From among the few possible choices, DC motors manufactured by Precision Microdrives Ltd of London, United Kingdom are specifically selected for consideration in this case. In connection, the relevant characteristics (as per datasheets provided by Precision Microdrives Ltd) for respective models of the DC motors under consideration are accordingly presented in a Table 400 shown in FIG. 4.

Figure 5:
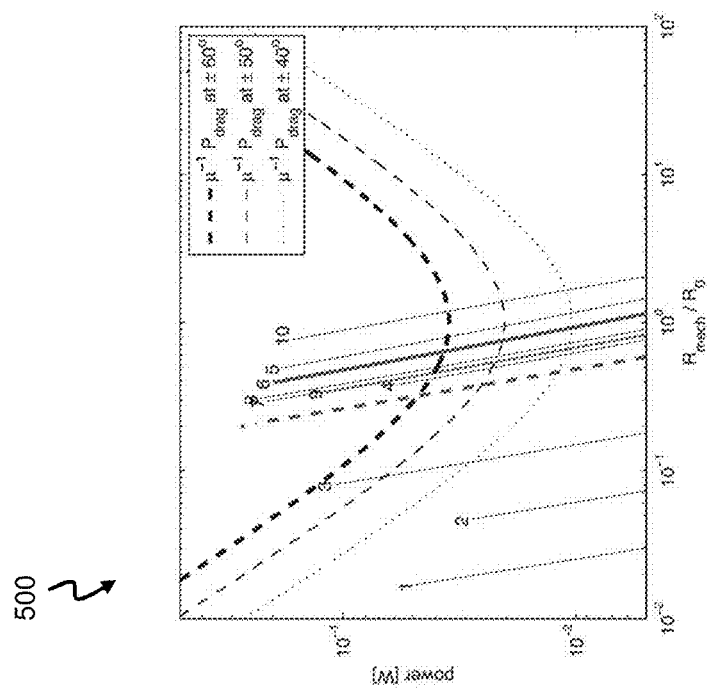
FIG. 5 is a graphical plot of power vs. impedance ratio used for selecting a DC motor to be used in the motorised device of FIG. 1.

FIG. 5 graphically represents equation (19) on a power vs. impedance ratio plot. Specifically, the right-hand side of equation (19), i.e. the required power, is represented by the U-shaped curves for three different stroke-angles at 35 Hz. In particular, the thickest curve is of interest for this embodiment, i.e. ±60 degrees stroke-angle. The left-hand side of equation (19), i.e. the available power, is represented by a line for each DC motor (identified by the number on top of the line which corresponds to the first column in the Table 400 of FIG. 4). The intersection of a motor line with a specific U-shaped curve identifies the power required to resonate the artificial wings 104 at a specific stroke-angle and frequency. A motor line graphically terminates whenever any operation limit occurs, as per the provided datasheets. Therefore, the intersection between a motor line and a load curve always identifies an operating condition within the rated limits of the DC motor. For this embodiment, only points within the rated voltage are used in its operation, as this is the only limit available from the provided datasheets, although more general constraints may be introduced if desired.

FIG. 5 clearly shows the advantage of selecting DC motors with optimal impedance match, i.e. $R_{mech}$ as close as possible to $R_0$, in order to minimize the required power and not to oversize the DC motor itself. The lines relative to DC motor models '108-004', '108-005' and '112-001' (i.e. lines respectively labelled as '5', '6' and '10' in FIG. 5) intersect the desired U-shaped curve relative to ±60 degrees stroke-angle around its minimum level of required power. From the Table 400 of FIG. 4, the DC motor model '112-001' is rather heavy while the remaining DC motor models weigh only 2.6 grams and are more suitable to be embedded in hummingbird-sized robots, for future applications. Between the '108-004' and the '108-005' DC motor model, the latter model is selected for use in this embodiment because of a specific mechanical feature, i.e. the shaft is accessible on both sides of the DC motor. This mechanical feature is very important in the actual prototype development of the motorised device 100, as detailed below.

A thick line in FIG. 5 is relative to the selected model (i.e. '108-005') and based on the typical values. After the DC motor 102 based on the selected model (i.e. '108-005') is purchased, the DC motor 102 is then characterised and the dashed line in FIG. 5 is based on experimental values obtained from the characterisation (i.e. indicated as bold numberings in the sixth row of the Table 400 of FIG. 4).

III. Materials and Methods

Figures 6A, 6B:
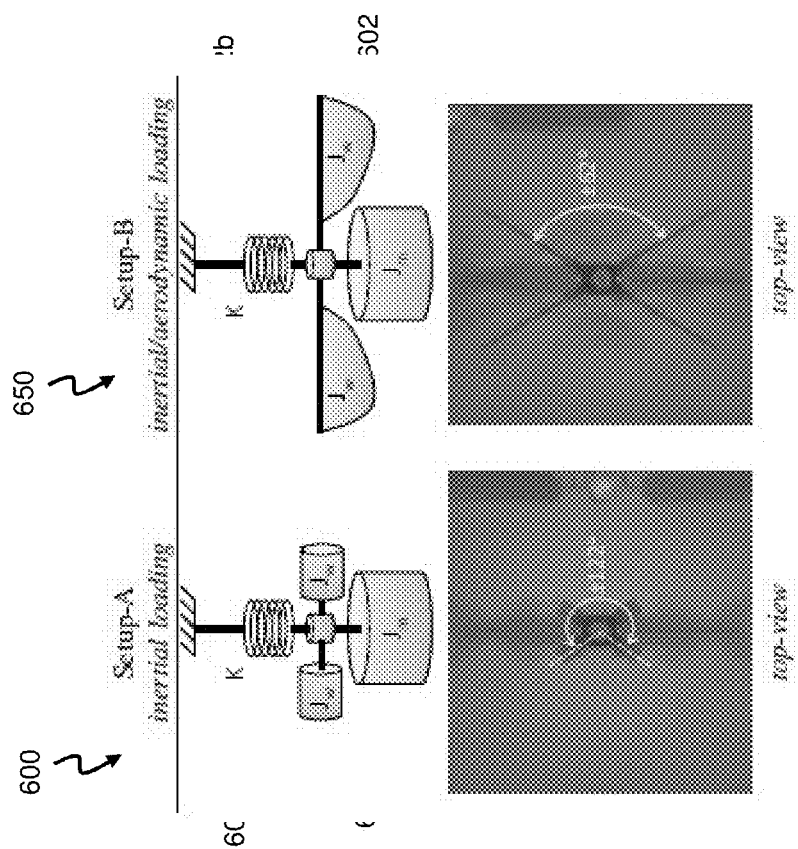
FIGS. 6a and 6b show respective schematic configurations of a Setup-A and a Setup-B used for investigating the effect of nonlinear aerodynamic damping to the flapping angle.

In order to test whether the selected DC motor 102 is able to efficiently flap the artificial wings 104 in presence of non-linear aerodynamic damping, at high frequency and large wing-stroke, a Setup-A 600 and a Setup-B 650 are devised as schematically represented in FIGS. 6a and 6b respectively. Also, the respective top views from a high speed camera (Photron Fastcam-X 1024 PCI) of the Setup-A 600 and Setup-B 650 are shown in FIGS. 6a and 6b, where two snapshots relative to the extreme angular positions are superimposed while the motorised device 100 (as configured to each setup) is driven with a 2V amplitude sinusoidal input voltage. Both the Setup-A 600 and Setup-B 650 consist of the DC motor 102 (i.e. model '108-005' as based on the above selection) directly driving a load via an elastic transmission (i.e. the resilient biasing means 106). In FIGS. 6a and 6b, a bottom cylinder 602 schematically represents the rotor of the DC motor 102, with a rotor inertia estimated to be:

$$J_m=3.38\cdot10^{-9} Kgm^2 \quad (22)$$

Figure 7:
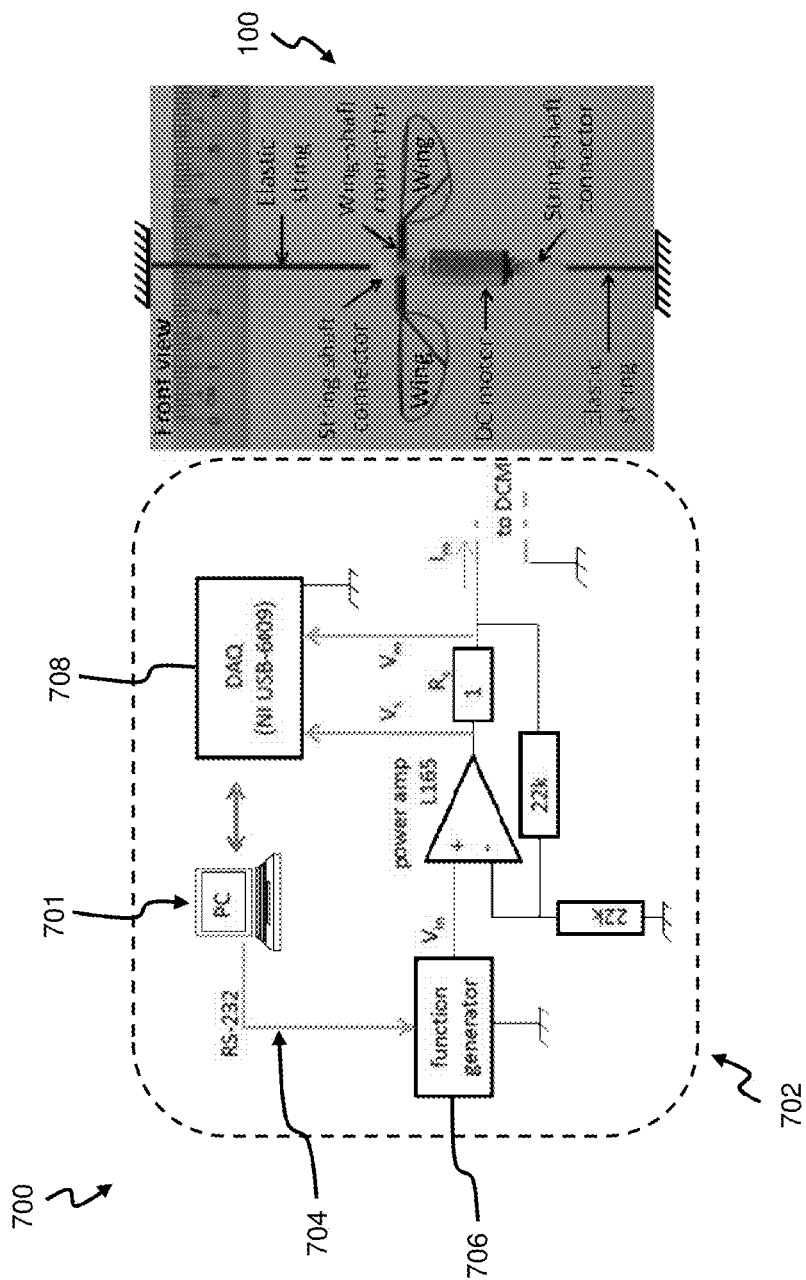
FIG. 7 shows a schematic diagram of an actual implementation of a system comprising the motorised device of FIG. 1 and electrical setups for related driver and data acquisition.

For the Setup-A 600, a purely inertial load consisting of two brass cylinders 604a, 604b is used, which are designed to introduce a total inertia equal to $2\times J_w$. For the Setup-B 650, two similar wings 652a, 652b (representing the pair of artificial wings 104) which, in addition to a total inertia equal to $2\times J_w$, introduce a nonlinear aerodynamic damping are devised. In both cases, the load is balanced to minimize centrifugal forces and any resultant friction at the motor bearings. In fact, both the two setups 600, 650 use the same DC motor and elastic transmission, while the two different loads are interchangeable. An actual implementation of a system 700, comprising (a prototype of) the motorised device 100 and an electrical setup 702 used for driver and data acquisition (the construction of which is apparent to skilled persons), is depicted in FIG. 7, showing where the pair of artificial wings 104 is attached, and each component of the system 700 is described in the following sections below. Specifically, the system 700 is used to implement the configurations of the Setup-A 600 and Setup-B 650 for the desired experiments to be performed. It is to be noted that although not visible in FIG. 7, during normal operation, the stator of the DC motor 102 is torsionally constrained, i.e. restrained from turning. Without such a constraint, due to conservation of angular momentum, any angular acceleration of the rotor in one direction would induce a rotation of the stator in the opposite direction.

A. Wings

For Setup-B 650, the pair of artificial wings 104, each shown in FIG. 2a, is used. Each artificial wing 104 consists a wing membrane made of 102.5 micron cellulose acetate film and two (leading edge and crossing) veins 202, 204 made of 0.5 mm carbon fiber rod. Also, the cross-section profile of the membrane is a flat plate, and its platform is a scaled-down replication of an experimental wing used in a previous related work. The root-to-tip distance and the maximum chordwise length are respectively 20 mm and 9 mm. As afore described, the pair of artificial wings 104 are plugged into the hollow wing-shaft connector 108 that laterally pierces the upper string-shaft connector 110 attached to the DC motor 102. To accommodate this arrangement, the leading edge vein 202 is extended by a few millimeters.

As the main purpose of the setups is to test the ability of the DC motor 102 to perform aerodynamic work under maximum drag conditions, the artificial wings 104 are fixed at a 90 degrees angle of attack. But it will be apparent that to be able to generate lift, an extra degree of freedom is to be subsequently introduced to allow for wing rotation. It will also be appreciated that whether active or passive, this extra degree of freedom will influence the motor, and consequently a second order mechanical system described as per equation (13) may need to be further revised to take into account this influence.

It is to be appreciated that the wing membrane and the (leading edge and crossing) veins 202, 204 are structured to be relatively thick compared to the size of each artificial wing 104. This combination is specifically chosen to create a very stiff artificial wing 104 so that constant drag coefficient can be maintained when the artificial wings 104 are being driven. A practical benefit of using rigid artificial wings 104 is relative to wing kinematic measurements. In connection, from the top views (shown in FIG. 6b) of the Setup-B 650 as seen from a high-speed camera, it is observed that for Setup-B 650, the artificial wing 104 appears as a rigid body at all times during motion.

As mentioned above, the shape of the artificial wings 104 adopted for the motorised device 100, including the 40 degrees crossing vein 204, is a scaled-down version of an experimental wing described in a previous related work. Based on the characterisation done in the previous related work and for a fixed 90 degrees angle of attack (as configured in the artificial wings 104 of the setup 650), a drag coefficient of $C_D$=2.5 is adopted and the damping coefficient $B_0$ is evaluated to be as per equation (4). Based on the 2D geometry and properties of the materials from which each artificial wing 104 is formed, the moment of inertia of each artificial wing 104 with respect to the center of rotation is numerically estimated to be as per equation (5).

B. Elastic Transmission

While actuators and artificial wings (but not necessarily similar to the ones in this embodiment) are essential components for flapping-winged robots, the resilient biasing means 106 is in fact an important aspect of the proposed motorised device 100, at least for applications involving DC motors directly driving the load.

The resilient biasing means 106, as only schematically represented in FIG. 6, is implementable in many different possible ways, as will be apparent to skilled persons. For characterisation purposes, in this instance, wires are used as torsion springs to guarantee linearity of the stiffness coefficient for relatively large angular displacements (a ±60 degrees torsion induces relatively low strains in a sufficiently long wire) and to be able to easily adjust the values of stiffness to desired needs for purposes of the experiments by simply selecting appropriate wire lengths.

While the schematic drawing in FIG. 6 shows only one spring 606 attached to the corresponding rotor 602 of the DC motor 102 of the Setup-A 600 and Setup-B 650, a symmetric structure whereas each side of the motor shaft is connected to a torsion spring (i.e. wire) is implemented for the motorised device 100, as shown in FIG. 7. To properly behave as torsion springs, the wires are configured to be in tension, although tension itself does not influence the torsion stiffness. Having equal tension on both sides of the shaft, avoids any axial loading of the DC motor 102 which would easily lead to prohibitive friction at the motor bearings. This is primarily the reason for selecting a DC motor (i.e. model '108-005') with the shaft accessible on both ends.

As afore described, the resilient biasing means 106 in this embodiment is realised using the nylon strings 106, and thus the two (elastic) nylon strings 106 in FIGS. 1 and 7 are made of 1.024 mm clear nylon, but painted in blue ink for greater visibility, and the length of each nylon string 106 is about 100 mm. For each nylon string 106, one end is fixed (i.e. mechanically grounded) whereas the other opposing end is secured to the tip of the motor shaft through (the upper and lower) string-shaft connectors 110, 112.

Based on the geometry and the material properties of the two nylon strings 106 and considering the range of possible values for Young's modulus of typical nylon strings, the expected torsion stiffness coefficient $K=2 \times I_s G_s = I_s$ is in the range of 1.5 to $4 \cdot 10^{-3}$ Nm/rad, where $I_s$ is polar moment of inertia, $G_s$ is the modulus of shear of elastic string, $I_s$ is the length of single nylon string, and the 2× factor accounts for the fact that two similar nylon strings 106 act in parallel on the motor shaft. The experimentally measured value for the overall stiffness is found to be in the lower end of the range:

$$K = 1.6 \cdot 10^{-3} \frac{\text{Nm}}{\text{rad}} \quad (23)$$

C. Data Acquisition

The experiments carried out based on the Setup-A 600 and Setup-B 650 consist a total of 3×21 trials during which the DC motor 102 is driven with sinusoids at different frequencies and different voltage levels. For each voltage level (i.e. 1.0V, 1.5V and 2.0V), the frequency is swept in the range of 28 Hz to 48 Hz, with increments of 1 Hz. Each sinusoid drives the setup for one second, to allow the system 700 to settle in a steady state, after which the electrical variables $V_s$ and $V_m$ as well as recordings from the high-speed camera video are stored for later processing. By using the electrical setup 702 in FIG. 7, the voltage $V_m$ across the motor terminals is directly measured, as well as the voltage $V_s-V_m$ across the sensing resistor $R_s$=1Ω in series with the motor armature. From the latter, it is then determined that the current $I_m$ in the motor $I_m=(V_s-V_m)/R_s$. It is also to be appreciated that resistor $R_s$ is not exactly in series but this is a realistic approximation as, from the electrical setup 702 in FIG. 7, the current flowing through the two 22 kΩ resistors is $V_m$=44 kΩ=68 μA, where 3V is the maximum voltage across the motor terminals.

The whole procedure was automated by a MATLAB script (installed on a PC 701) used to set, over an RS-232 communication channel 704, the frequency and voltage levels of a function generator 706 as well as to start/stop the data logging from a data acquisition board 708 (National Instrument USB-6009) at 10 kHz sampling rate. At the same time, the high speed camera (Photron Fastcam-X 1024 PCI) is used to record the wing motion (from a top view, as shown in FIG. 6) at 6000 frames per second.

D. Data Preprocessing

A series of grayscale images obtained by the high speed camera is processed by comparing, for each image, the next with the previous one, easily identifying the pixels in the image undergoing a change of intensity. Using an ad-hoc threshold, the pixels that are changing intensity due to the wing motion are isolated. A simple regression analysis of the coordinates of such pixels was then used to estimate the wing angle (superimposed straight line in the bottom snapshot of FIG. 6b). The algorithm failed only when the velocity is close to zero, leading to misestimates in 3% to 4% of the images. These cases can be easily identified by the severe discontinuity of the estimates. After removing these artifacts, the signal is numerically differentiated to derive an estimate of the angular velocity $\omega^{raw}(t_i)$, where $t_i$ is a discrete time relative to the 6000 frames per second sampling rate of the high speed camera deployed. Due to the video processing and to the numerical differentiation, the velocity estimates are affected by high-frequency noise which requires some filtering. Since by definition periodic signals are being dealt with, the discrete-time Fourier series coefficients $\alpha_n$ and $\beta_n$ are derived from the discrete-time signal $\omega^{raw}(t_i)$, and filtering is performed by only considering harmonics of order not higher than five (n≥5), i.e. the time-continuous filtered signal in this case is defined to be:

$$\omega^*(t) := \sum_{n=1}^{5} \alpha_n \sin(2\pi n f_0 t) + \beta_n \cos(2\pi n f_0 t) \quad (24)$$

where $f_0$ is the frequency of the input sinusoid driving the DC motor 102. It is to be highlighted that in this instance, only periodic signals with fundamental frequency around 35 Hz are of interest, and thus the reason why harmonics higher than 175(=5×35) Hz are discarded.

Once the discrete-time Fourier series coefficients $\alpha_n$ and $\beta_n$ are known, the stroke angle $\theta^*(t)$ and acceleration $\alpha^*(t)$ are easily computed as:

$$\theta^*(t) := \frac{1}{2\pi f_0} \sum_{n=1}^{5} -\frac{\alpha_n}{n} \cos(2\pi n f_0 t) + \frac{\beta_n}{n} \sin(2\pi n f_0 t) \quad (25)$$

$$\alpha^*(t) := 2\pi f_0 \sum_{n=1}^{5} n\alpha_n \cos(2\pi n f_0 t) - n\beta_0 \sin(2\pi n f_0 t) \quad (26)$$

Figure 8:
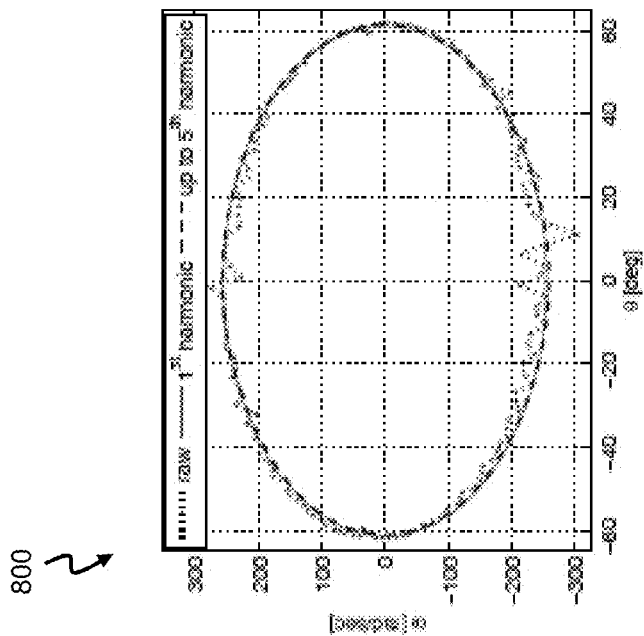
FIG. 8 is a plot of state space for the wing kinematics (i.e. angular velocity vs. angular position) of the motorised device of FIG. 1.

A similar filter is applied to the electrical variables, i.e. voltage and current at terminals of the DC motor 102. FIG. 8 accordingly shows a plot 800 of state space for the wing kinematics (i.e. angular velocity vs. angular position) of the motorised device 100, as obtained from the experimental data. It is appreciated that the raw experimental data, as acquired from the high-speed video camera are superimposed with the first harmonic as well as with a truncated Fourier series containing all the harmonics up to the fifth order.

E. Simulations

Along with the experiments as afore described, simulations of the whole system are performed, taking into account the nonlinearities of the second order mechanical system as described in equation (13) together with the full system dynamics of the DC motor 102 as described in equation (14), including the effects of the armature inductance. In particular, for the numerical simulations, no simplifying assumptions are applied. The ode45 function in the MATLAB environment is used, which returns also the transient analysis. As steady-state solutions are of particular interest, exactly one time period is simulated starting from an arbitrary zero state vector. It is further to be appreciated that a three-dimensional state vector, comprising motor current, wing angle and wing velocity, is defined. The final conditions are then used as initial conditions for a subsequent simulation and the whole process is reiterated until the final conditions are deemed close enough (by an arbitrary threshold) to the newest initial conditions. Only a few iterations are necessary to obtain approximately periodic solutions of the equations (13) to (14). At this point, the same analysis is carried out for both the experimental data and simulations, to be next described.

IV. Experimental Data Analysis and Model Predictions

A. Experiments with Purely Inertial Loads (i.e. the Setup-A 600)

The purpose of the experiments conducted based on the Setup-A 600 is to verify the reliability of the electro-mechanical model of the DC motor 102 as described in equation (14). Among the various estimated parameters needed to predict the behavior of the motorised device 100 as per equation (14), the aerodynamic damping coefficient $B_0$ is considered to be the least reliable. The purely inertial load used for the Setup-A 600 has a negligible aerodynamic damping, and therefore the only damping comes from the friction at the motor bearing. It is also to be appreciated that the intrinsic damping of the nylon strings 106 is negligible with respect to the motor damping as easily tested with a torsion pendulum configuration, where the DC motor 102 is replaced by a pure cylinder. The bottom snapshot in FIG. 6a shows two superimposed snapshots (top views) of the Setup-A 600, representing the two extreme angular positions of the load (i.e. the brass cylinders 604a, 604b) when the DC motor 102 is driven with a 2.0V sinusoidal input (note: this is lower than the rated 3.0V voltage). As clear from the bottom snapshot of FIG. 6a, the motorised device 100 undergoes approximately a ±122 degrees stroke which is perfectly in line with the model prediction. It should be highlighted that the output kinematics are much higher than the target kinematics for the final application, although relatively low voltage was required due to the low friction at the motor bearing.

B. Experiments with Winds (i.e. the Setup-B 650): Output Kinematics

Unlike for the purely inertial load (i.e. experiments done with reference to Setup-A 600), when the artificial wings 104 are flapped, the model predicted higher displacements than those experimentally measured, meaning that the damping coefficient $B_0$ previously characterised in equation (4) is underestimated. By simply adjusting the value of the damping coefficient $B_0$, it is difficult to match experimental and simulation results for all amplitudes. Since a realistic estimation of this damping coefficient $B_0$ is important to infer the power dissipated against the aerodynamic damping, as detailed later, a value for $B_0$ is heuristically selected, which would at least match the experimental data in the range of desired kinematics, i.e. ±60 degrees wing-stroke. This heuristically selected specific value for $B_0$ is:

$$B_0^* := 2 \times 2.05 \cdot 10^{-9} Kgm^2 rad^{-2} \quad (27)$$

with a 2× factor to account for both the artificial wings 104. This matching is shown in the respective plots of FIG. 9 and is fairly accurate for the target amplitude (±60 degrees) but, at lower amplitudes, the model still predicts large motions than the actual ones. This amplitude-dependent difference clearly highlights a nonlinear behavior. Since the major nonlinearity is due to the aerodynamic damping, the fact that the model cannot match the experiments at all amplitudes is indicative of the degree of simplifications behind the quasi-steady blade element analysis which led to equation (2).

Theoretical predictions and experimental results agree in that mechanical resonance is relatively independent of the input amplitude. In this sense, it is possible to modulate the flapping amplitude without affecting the flapping frequency, i.e. maintaining the mechanical resonance condition. It is also important to notice that any DC offset in the input voltage translates into an offset in the mean flapping angle. It is to be appreciated that the angular offset relative to a constant input voltage (i.e. DC offset) is $T_{stall}/K$, being approximately 25 degrees at nominal 3V DC, as can be seen from the Table 400 of FIG. 4 and equation (23). The possibility to independently control flapping frequency, wing stroke and mean flapping angle is important for control purposes, as discussed later.

C. Inverse Dynamics, Power Analysis and Dynamic Efficiency

While measuring kinematics is straightforward, measuring forces is technologically more challenging. For this reason, indirect torques estimation from measured kinematics is used, which is also known as inverse dynamics analysis. To this end, each single term in equation (13) is evaluated, which comprises inertial ($\tau_i^*$), aerodynamic ($\tau_a^*$), friction ($\tau_f^*$), elastic ($\tau_e^*$) as well as motor ($\tau_m^*$) torques and are respectively defined as follows:

$$\tau_i^* := J_{tot} \alpha^*(t) \quad (28)$$

$$\tau_a^* := B_0 \omega^{*2}(t) \text{sign}(\omega^*(t)) \quad (29)$$

$$\tau_f^* := b_0 \omega^*(t) \quad (30)$$

$$\tau_e^* := K\theta^*(t) \quad (31)$$

$$\tau_m^* := \tau_i + \tau_a + \tau_f + \tau_e \quad (32)$$

It is highlighted that the asterisk (*) denotes a truncated Fourier series containing harmonics up to the 5th order. Once the kinematics is known and the various torques are estimated via inverse dynamics, the instantaneous power can be estimated as torque times angular velocity. For dissipative torques, such as aerodynamic damping and motor friction, the instantaneous power is by definition non-negative and so is the average power.

When it comes to inertial and elastic torques, the instantaneous power is a time derivative of the kinetic energy $\frac{1}{2}J_{tot}\omega^{*2}$ and the elastic energy $\frac{1}{2}K\theta^{*2}$ respectively. Therefore the average power is identically zero, being both energy functions periodic of period T.

In analyzing the 'fitness' to fly of hovering animals such as hummingbirds, related prior works have considered the work done by the muscles without accounting for its sign. For example in one prior work, the 'mean inertial power' is defined as the work done by muscles to accelerate wings from zero to maximum angular velocity during the first half of a half-stroke, i.e. a quarter of period. This is equivalent to the average of the norm of the instantaneous power, i.e. without considering its sign, which in the case of inertial torques becomes:

$$\overline{P}_i^+ = \frac{1}{T}\int_0^T |\tau_i \cdot \omega|dt = \frac{\frac{1}{2}J_{tot}\omega_{max}^{*2}}{4T} \quad (33)$$

A similar approach is followed and the norm of motor power is considered, being:

$$\overline{P}_m^+ = \frac{1}{T}\int_0^T |\tau_m \cdot \omega|dt \quad (34)$$

since, also in the case of artificial 'muscles' such as DC motors, the negative work done by the DC motor 102 to decelerate each artificial wing 104 cannot be efficiently recovered at the electrical port of the DC motor 102, mainly due to the motor resistance.

Another piece of related prior work used a very effective graphical representation for computing the average power contributions due to the different sources as per equations (28) to (32). In fact, a simple change of variable in the integral, $$\int_0^T \tau \cdot \omega(t)dt = \int_{\theta(0)}^{\theta(T)} \tau d\theta \quad (35)$$

suggests that average power can be graphically represented as an area in a torque vs. angle plot, which is used to evaluate power contribution in the case of quasi-sinusoidal approximations. For more accurate calculations involving higher harmonics, this embodiment uses numerical integration, although the graphical representation is still very effective to understand what happens beyond the quasi-sinusoidal approximation.

Figure 10:
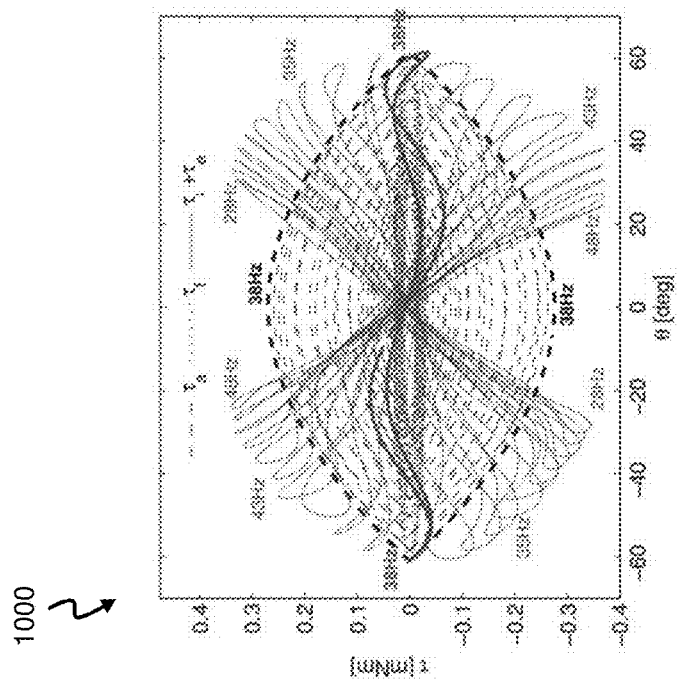
FIG. 10 shows a plot of the torque vs. wing angle representation of the aerodynamic torque ($\tau_a$), the friction torque ($\tau_f$) and the elasto-kinetic torque ($\tau_i+\tau_e$) of the motorised device of FIG. 1.

FIG. 10 shows a plot 1000 of the torque vs. wing angle representation of the aerodynamic torque ($\tau_a$), the friction torque ($\tau_f$) and the elasto-kinetic torque ($\tau_i+\tau_e$), superimposing the experimental results in response to input voltage sinusoids with 2.0V amplitude and different frequencies (of between 28 Hz and 48 Hz, with a 1 Hz step). The algebraic sum of these components corresponds to the torque provided by the DC motor 102, as in equation (32). The areas underneath the curves correspond, for each frequency, to the average power (times the period T). It can also be seen from FIG. 10 that elasto-kinetic torques ($\tau_i+\tau_e$) appear as 'stretched loops' and aerodynamic torques are depicted as ellipses (the largest occurring at 38 Hz, as labeled). Thicker lines in the plot then indicate resonance conditions, which occurs at 38 Hz in the motorised device 100 of this embodiment.

Figure 11:
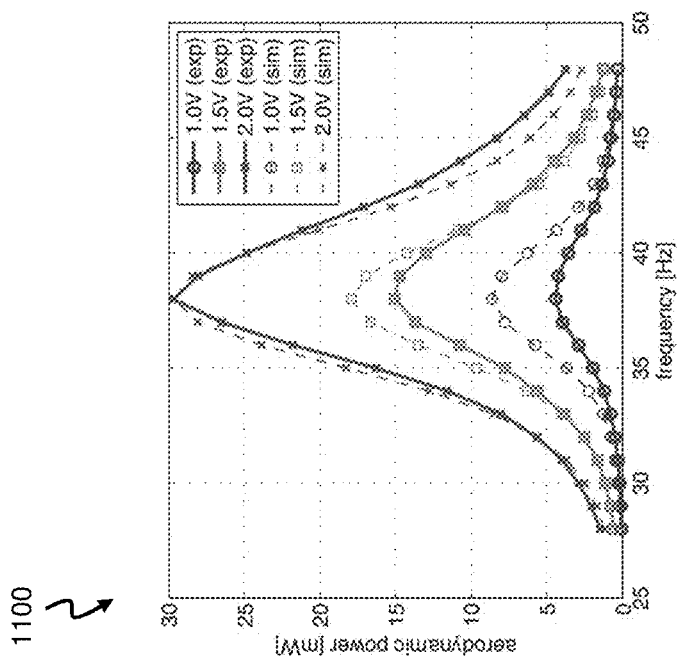
FIG. 11 shows a plot of average aerodynamic power of the motorised device of FIG. 1, with respect to both experimental and simulated data, for different frequencies and different input voltages.

The curves for friction and aerodynamic damping are quasi-elliptical and enclose the largest area at resonance (i.e. the thickest dashed line), i.e. in presence of larger wing strokes. It is clear how, near resonance, the power dissipated against aerodynamic damping is much larger than the one due to motor friction. The average aerodynamic power for both experimental data and simulations, is represented in greater details in a plot 1100 shown in FIG. 11, for different frequencies and different input voltages. More specifically, FIG. 11 plots experimental (i.e. depicted as solid lines) and simulated (i.e. depicted as dashed lines) average aerodynamic power at different frequencies and at different input voltage levels (1.0V, 1.5V, 2.0V, as denoted by the markers).

The curves relative to the elasto-kinetic torque appear in FIG. 10 (i.e. depicted as solid lines) as 'stretched loops', rather than elliptical. To explain the origin of such 'stretched loops', it is instructive to see what happens in a quasi-sinusoidal approximation. In this ideal case, the angular position ($\theta$) and the angular acceleration ($\alpha$) are perfectly in phase, as clear from equations (6) and (8). This means that, within a quasi-sinusoidal approximation, the elasto-kinetic torque $\tilde{\tau}_{ie}$ is also proportional to the stroke angle $\theta_0$, by a factor defined as:

$$\frac{\tilde{\tau}_{ie}}{\tilde{\theta}} = K - (2\pi f_0)^2 J_{tot} \quad (36)$$

It is clear that this proportionality is zero at resonance, as defined in equation (15), positive at lower frequencies and negative at higher frequencies. In this ideal case, at resonance, the elastic and the inertial torque perfectly balance one another and the DC motor 102 has only to overcome dissipative torques.

When higher harmonics are introduced, due to the nonlinear aerodynamic damping, the elasto-kinetic torque ($\tau_i+\tau_e$) is no longer perfectly in-phase with the stroke angle, although a linear trend can still be observed. Nevertheless, the benefits of mechanical resonance are still visible, as the elasto-kinetic power at resonance (i.e. the graph area underneath the thickest solid line) is still much lower than the aerodynamic power (i.e. the graph area enclosed by the thickest dashed line).

It is also highlighted that the maximum motor torque (i.e. the thick, solid line in FIG. 10) is much smaller than the maximum aerodynamic torque (i.e. the thick, dashed line in FIG. 10) while, without an elastic string, the inertial torques (entirely provided by the DC motor 102) would be more than 6.9 times larger, as shown previously.

Figure 12:
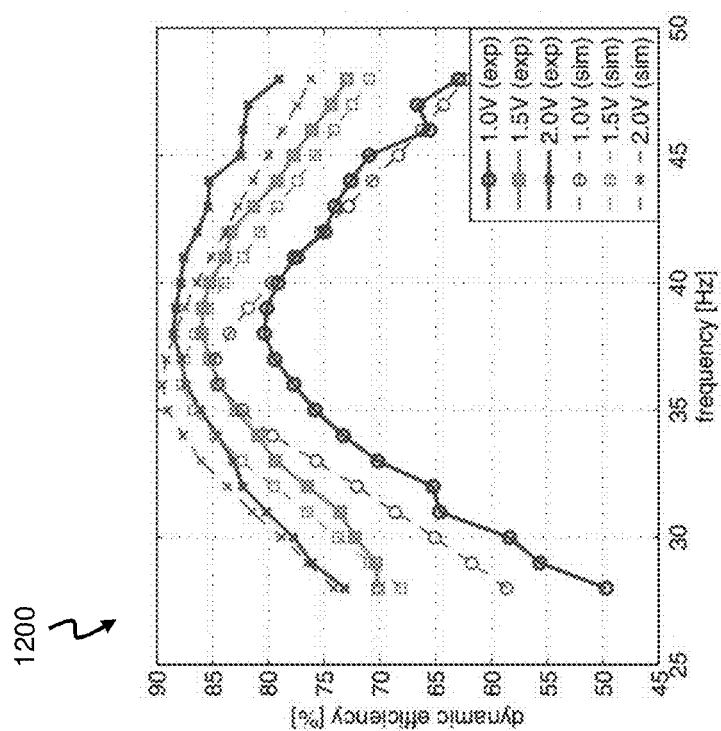
FIG. 12 shows a plot of dynamic efficiency of the motorised device of FIG. 1, with respect to both experimental and simulated data, at different input voltages and different frequencies.

The benefits of mechanical resonance are best captured by the so-called dynamic efficiency, defined as:

$$\eta_{dynamic} := \frac{\overline{P}_a}{\overline{P}_m^+} = \frac{\int_0^T \tau_a^* \cdot \omega^* dt}{\int_0^T |\tau_m^* \cdot \omega^*| dt} \quad (37)$$

which, at larger wing strokes, reaches values close to 90% for both experimental data and simulations, as shown in a plot 1200 at FIG. 12. More specifically, in FIG. 12, the plot 1200 shows experimental (i.e. depicted as solid lines) and simulated (i.e. depicted as dashed lines) dynamic efficiency at different input voltages and different frequencies.

The dynamic efficiency is a measure of optimality which does not include the actuator properties. Therefore, it is important to analyse what percentage of the input power $\tilde{P}_{VI}$ (e.g. being generated from a battery), can be dissipated against the aerodynamic damping. This is termed as overall efficiency and defined as:

$$\eta_{overall} := \frac{\overline{P}_a}{\overline{P}_{VI}} = \frac{\int_0^T \tau_a^* \cdot \omega^* dt}{\int_0^T V_m \cdot I_m dt} \quad (38)$$

Figure 13:
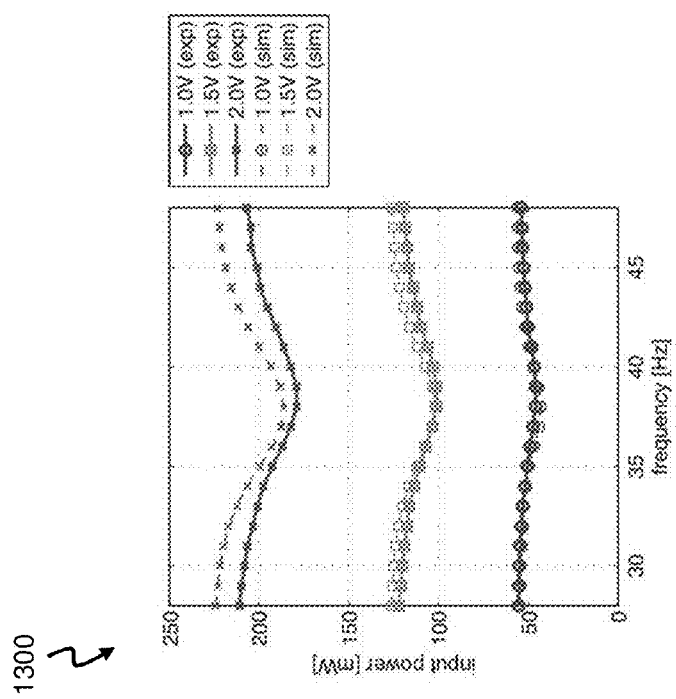
FIG. 13 shows a plot of average input power required by the motorised device of FIG. 1, with respect to both experimental and simulated data, at different input voltages and different frequencies.
Figure 14:
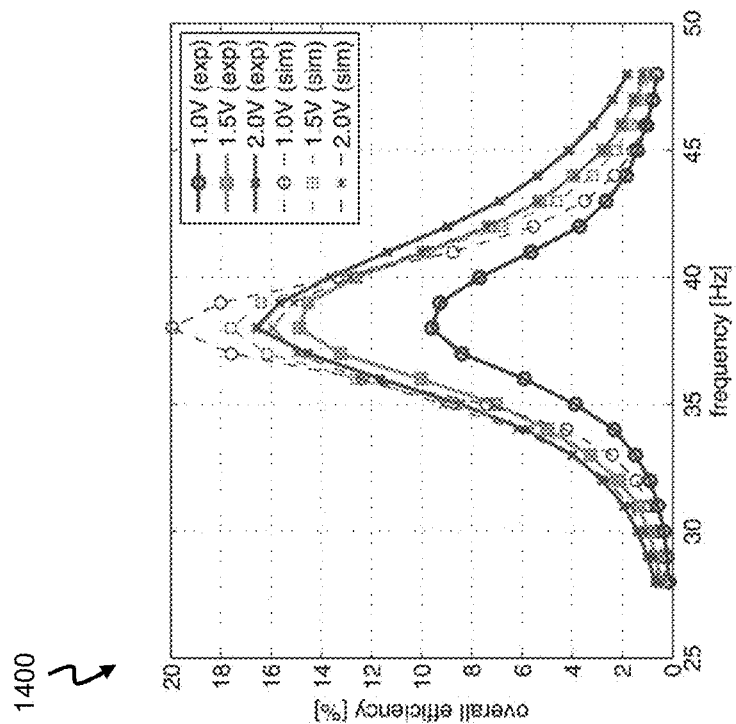
FIG. 14 shows a plot of overall efficiency of the motorised device of FIG. 1, with respect to both experimental and simulated data, at different input voltages and different frequencies.

The input power, for all frequencies and input voltages, is represented in a plot 1300 depicted in FIG. 13. Specifically, FIG. 13 shows experimental (i.e. depicted as solid lines) and simulated (i.e. depicted as dashed lines) average input power at different input voltages and different frequencies. It should be appreciated that how, at resonance, while the wing-stroke increases, the input power actually decreases. The overall efficiency is plotted, for all frequencies and input voltages, in a plot 1400 of FIG. 14. Specifically, FIG. 14 shows experimental (i.e. depicted as solid lines) and simulated (i.e. depicted as dashed lines) overall efficiency at different input voltages and different frequencies. Firstly, it should be appreciated that in the best scenario, i.e. when the load impedance matches the load, an overall efficiency of more than 50% is difficult to attain since, as the remaining 50% of power is dissipated in the motor armature resistance. Secondly, the actual matching condition (i.e. depicted as asterisked, thick dashed line in FIG. 5) is not optimal as predicted from the catalog data (i.e. depicted as thick, solid line in FIG. 5). This leads to an overall efficiency of nearly 17% for the largest wing-strokes, at mechanical resonance.

D. Flapping Wings without the Benefits of Resonance

Figure 15:
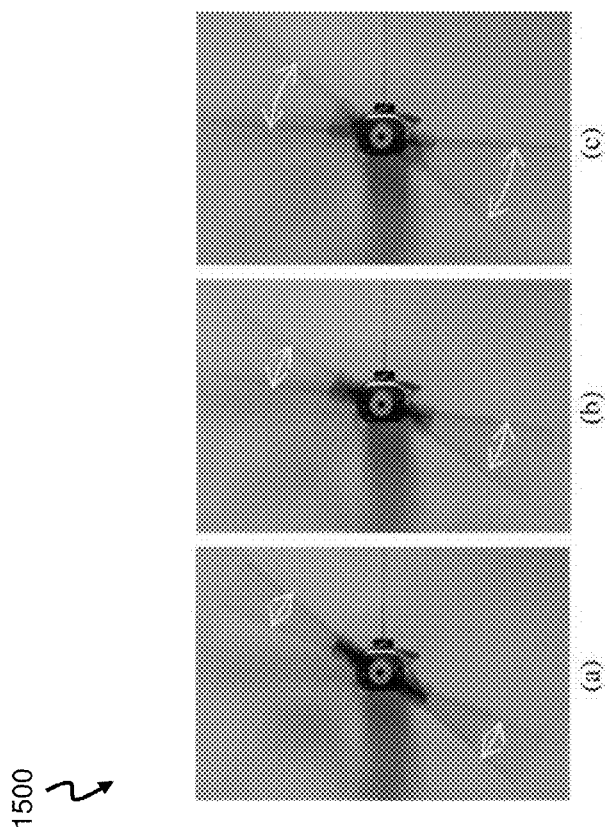
FIG. 15 shows a series of snapshots in relation to output wing motions of the motorised device of FIG. 1 taken from a top view thereof, in a configuration without an elastic element in response to input sinusoids at 38 Hz and at input voltages of (a) 1.0V, (b) 1.5V, and (c) 2.0V.

To test the ability of the DC motor 102 to flap the artificial wings 104 without the benefits of mechanical resonance, the (elastic) nylon strings 106 are removed and the DC motor 102 is driven with a sinusoidal voltage at 38 Hz, with the same voltage amplitudes used in previous section (i.e. 1.0V, 1.5V and 2.0V). As expected, the DC motor 102 is unable to produce large wing motions. FIG. 15 shows a series of photoshots 1500 of the output wing stroke which, at the maximum input voltage (i.e. at 2.0 V), is no larger than ±17 deg. The series of photoshots 1500 are taken from a top view of the motorised device 100 using a webcam, and the wing stroke angle can be inferred by the blurring, as clearly seen from FIG. 15. It is to be noted that since the nylon strings 106 are removed, there is no equilibrium point and the average position thus drifted from trial-to-trial.

E. Suitability for Autonomous Vehicles

It is to be appreciated that the system 700 shown in FIG. 7 is primarily devised for purpose of characterisation. In particular, the nylon strings 106 are used as torsion springs to guarantee linearity of the stiffness coefficient at relatively large angular displacements and to be able to easily adjust the values of stiffness as desired by simply selecting appropriate string lengths. Of course, a different implementation is required for a future, autonomous flying vehicle, which is to be described in the sections below.

Further embodiments of the invention will be described hereinafter. For the sake of brevity, description of like elements, functionalities and operations that are common between the embodiments are not repeated; reference will instead be made to similar parts of the relevant embodiment(s).

According to a second embodiment, a compact and lightweight motorised device 1600 (i.e. see FIG. 16a), being a variant of that 100 shown in FIG. 1, is now described. In particular, this present motorised device 1600 is developed to test the potentiality of the approach described in the first embodiment, and is found to display similar performance as the motorised device 100 of FIG. 1, which is used for characterisation as will be appreciated by now. It is highlighted that a difference of this present motorised device 1600 compared the motorised device 100 of FIG. 1 lies in the resilient biasing means 106, in which compact helical springs 1602 (e.g. MISUMI wire spring, model no. WFH4-5) are now used (in place of the nylon strings 106), and the compact helical springs 1602 are attached between the rotor shaft and the stator of the DC motor 102.

Another difference is that two similar DC motors 102 are used to implement proper wing flapping (as opposed to the motorised device 100 of FIG. 1, in which the pair of artificial wings 104 is in a coplanar arrangement). It is to be appreciated that the two DC motors 102 used are similar to the model adopted for the first embodiment. In fact, a single, larger wing is attached to each motor which can be flapped at the cost of some additional friction at the motor bearings, due to centrifugal axial loading, with minimal degradation of performance. Further, the present motorised device 1600 is configured with the two DC motors 102 driven in parallel by a single driver (not shown). But of course, each DC motor 102 may alternatively be driven by a different respective driver, leading to different kinematics for the left and right artificial wings 104, which is useful from a control perspective.

Moreover, another possibility may be to have the two DC motors 102, each driving two coplanar artificial wings 104 (as per the setup shown in FIG. 1), to implement an X-Wings configuration which is shown to be very effective in capturing clap-and-fling aerodynamic effects.

Figure 16A:
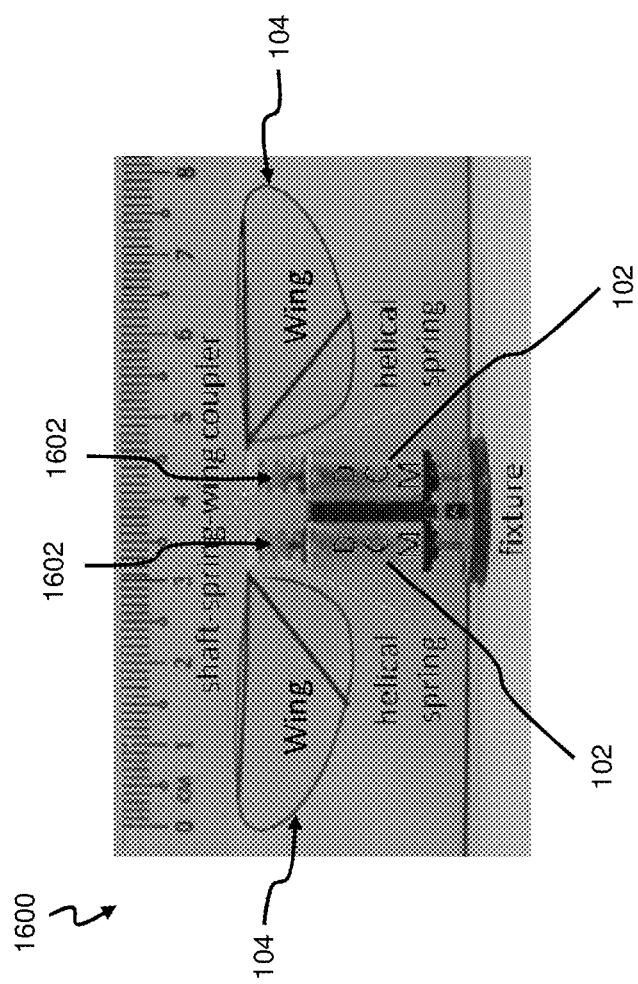
FIGS. 16a and 16b show a variant motorised device and an associated setup according to a second embodiment.
Figure 16B:
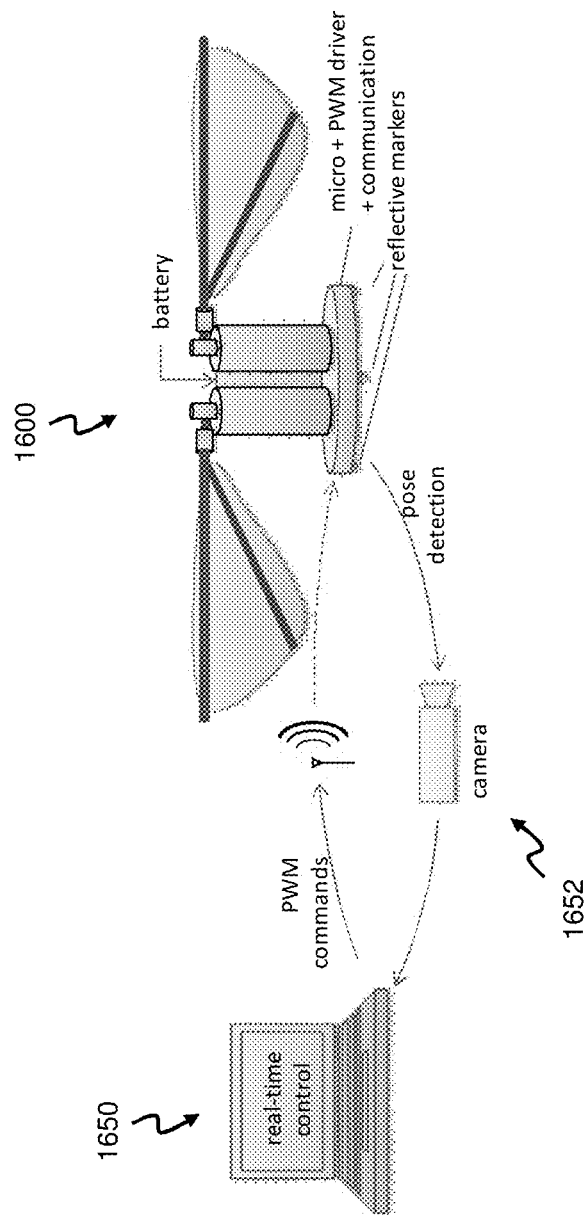

Further also, in this second embodiment, a computing device (e.g. a PC) 1650, and at least one camera 1652 (as depicted in FIG. 16b) are provided together with the motorised device 1600 of FIG. 16a. Specifically, the computing device 1650 is in wireless communication with the motorised device 1600 of FIG. 16a, and in wired/wireless communication with the camera 1652. As will be appreciated, the computing device 1650 and the camera 1652 forms a real-time tracking system arranged to provide motion tracking (e.g. a motion tracking system from Vicon Motion Systems Ltd of Oxford, United Kingdom) and real-time stabilisation/control to the motorised device 1600 of FIG. 16a during flight, and thereby enabling semi-autonomy.

Figure 17:
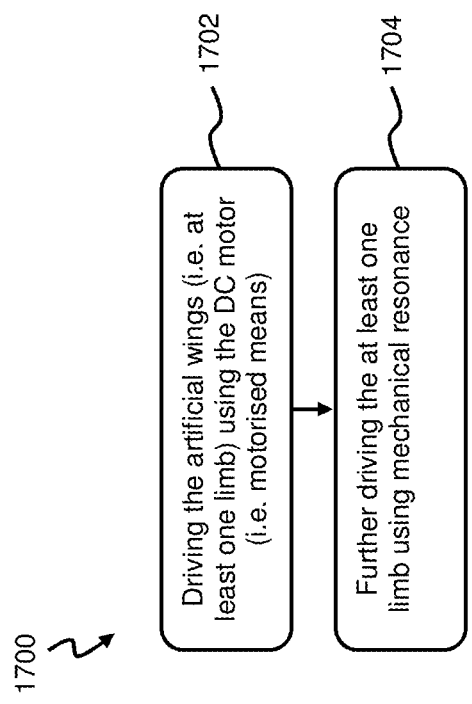
FIG. 17 is a flow diagram of a method for moving the motorised devices of the first and second embodiments in an environment.

FIG. 17 is a flow diagram of an exemplary method 1700 for moving the motorised device 100, 1600 of the first and second embodiments in an environment. Specifically, at a step 1702, the coupled artificial wings 104 are driven by the DC motor 102 for moving the motorised device 100, 1600 (through means of at least one force generated by virtue of movement of the artificial wings 104). Since in the first and second embodiments, the motorised device 100, 1600 is exemplified as a micro aerial device, the at least one force in this case thus refers to an aerodynamic force such as a lift force (but not limited to). Thereafter, in another step 1704, the artificial wings 104 are then further driven using the mechanical resonance of the resilient biasing means 106 (either the nylon strings 106 or the helical springs 1602). In this manner, the motorised device 100, 1600 is consequently able to move and be navigated to anywhere in the air, as will be understood by and apparent to skilled persons.

V. Discussion

In this section, discussions of the foregoing results and comparison with conventional approaches are described.

A. Second-Order Systems and Nonlinearities

The behaviour of the respective motorised devices 100, 1600 of FIGS. 1 and 16 is described by the second-order differential equation (13), where the nonlinearity is solely due to the damping term (i.e. second term of the left-hand side of equation (13)), while the inertial and elastic terms (respectively, the first and the last term of the left-hand side of equation (13)) are linear. Linearity of the inertial term is guaranteed by the direct drive, while linearity of the elastic term is a consequence of implementing the resilient biasing means 106 via nylon strings 106 (i.e. as long and thin wires).

Figure 9:
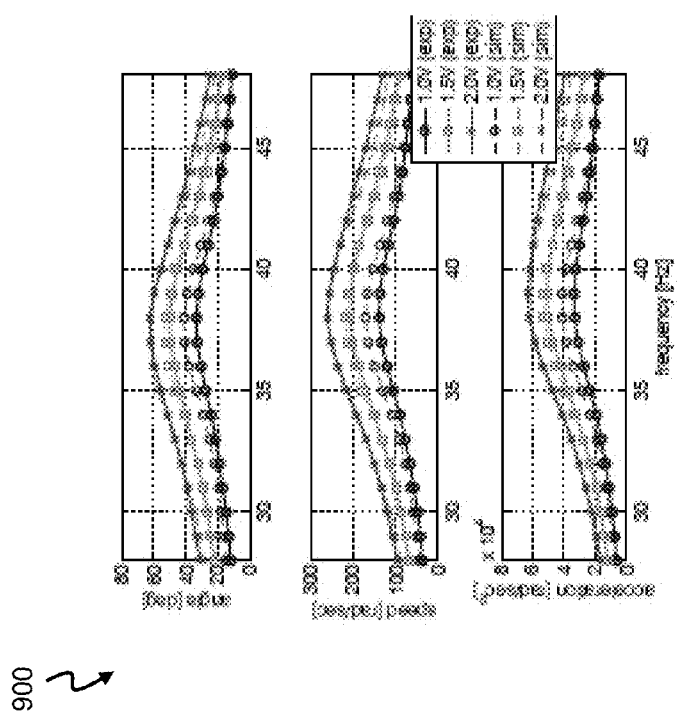
FIG. 9 shows respective plots of experimental and simulated kinematics vs. frequency of the motorised device of FIG. 1, for a range centred around mechanical resonance.

A first property of systems such as the second order system described in equation (13) is that the resonant frequency is relatively independent of the nonlinear damping, as shown by the foregoing model prediction above, as well as experimental measurements at different input voltage amplitudes, as depicted in FIG. 9. This is not the case when the elastic term is nonlinear, which might give rise to undesirable "jump phenomena" and resonant frequency shifts.

A second property of systems such as the second order mechanical system described in equation (13) is that, despite the nonlinear damping, solutions still maintain a quasi-sinusoidal regime, at least for sinusoidal forcing inputs, allowing for AC steady-state "quick estimates". Unlike direct drive, slider-crank mechanisms suffer from an inherent nonlinearity in the inertial term which reduces the benefits of resonance due to the non-negligible presence of higher order harmonics.

B. Power Considerations for Motor Selection

DC motors are rated by manufacturers based on DC steady state operating conditions, i.e. assuming that voltage (V), current (I), speed (w), and torque (T) are constant. Operational limits provided by the manufacturers are mainly meant to prevent overheating of the DC motors, which are directly related to the average power, but not the instantaneous power. For DC steady state, average power can be evaluated directly as the product of constant variables such as VI or T$\omega$. At AC steady state, the average power depends on the amplitude but also on the phase difference. For example, the average electrical power is evaluated as $\frac{1}{2}V_0 I_0 \cos \Phi$, where $V_0$ and $I_0$ are the amplitude of AC voltage and AC current, respectively, and $\Phi$ is the phase difference between them. The $\frac{1}{2}$ factor in the AC power formula means that the maximum operating conditions for variables such as, for example, voltage and current can have peak values higher than the nominal values, i.e. than those rated by the manufacturers at the DC steady-state case, before exceeding the ultimate power limits which would cause overheating. It is to be appreciated that however, when operating at AC steady state, even before overheating might occur, current amplitudes beyond the nominal DC values might lead to magnetic saturation.

In relation to the selected DC motor 102 (i.e. the '108-005' model indicated by line '6' in FIG. 5), the rated 339 mW maximum power (i.e. see the seventh column $P_{max}$ in the Table 400 of FIG. 4) clearly exceeds the required 30 mW (i.e. minimum level of the top U-shaped curve). This means that, in principle, a smaller DC motor would also be suitable but none of the lighter DC motors in the Table 400 of FIG. 4 meets the 30 mW requirement, except for the DC motor corresponding to the '107-001' model indicated by line '4' which however displays very little safety margin as shown in FIG. 5 (especially considering that actual parameters might differ from the values stated in the manufacturer's catalogue, as seen for the selected DC motor 102 corresponding to the '108-005' model indicated by line '6').

It is also interesting to notice how the DC motor corresponding to the '106-001' model indicated by line '3' is actually sufficiently powerful (88 mW) but does not pierce the 30 mW curve due to an impedance mismatch. A possible solution would be to design an appropriate linear transmission (e.g. gear-head system) to ensure impedance matching, equivalent to shifting the line indicated as '3' rightwards in FIG. 5. But it is also to be appreciated that such a solution accordingly increases complexity and reduces efficiency.

C. Potential Benefits with Respect to Conventional Approaches

Based on the foregoing embodiments of the present invention, the following advantages over conventional solutions are presented below. Specifically, one main difference in contrast to conventional approaches (which are based on nonlinear transmissions, such as slider-crank mechanisms), lies in the reciprocating motion of the DC motor 102. A clear advantage of the proposed approach of the present invention is the reduction of system complexity: beside the DC motor 102 and the pair of artificial wings 104, only the resilient biasing means 106 (e.g. the helical springs 1602 or nylon strings 106) is needed, making the entire system very robust and inexpensive. In this case, exploiting mechanical resonance is a necessity as it would be highly inefficient, if not impossible, to generate large wing-strokes at high-frequency without an elastic mechanism storing and releasing energy, as shown described above. Conventional approaches do not require the resilient biasing means 106 although they would indeed benefit from exploiting the effect of mechanical resonance. However, due to inherent nonlinearities, the benefits of mechanical resonance cannot be fully exploited and it would be very interesting to compare, on a fair ground, the two approaches in terms of efficiency.

Figure 18:
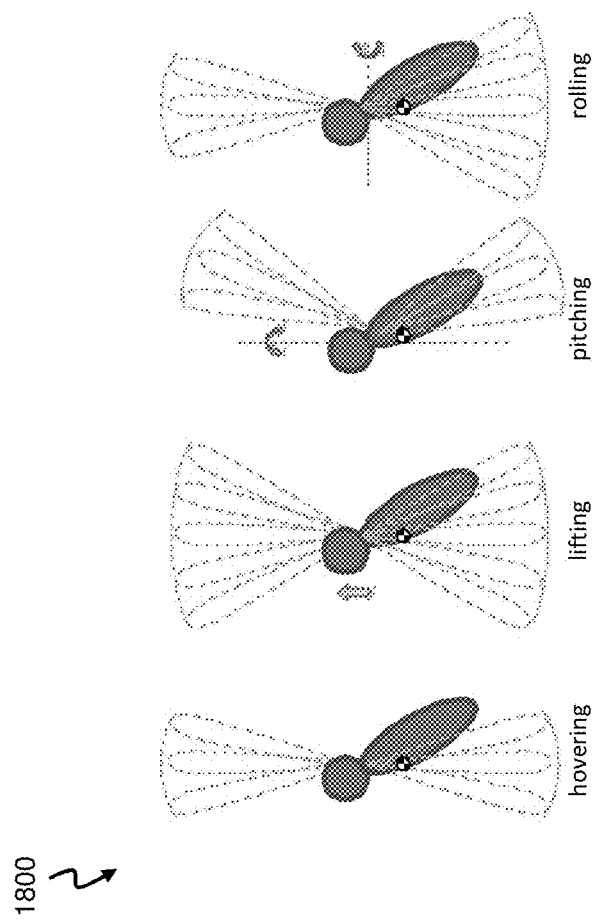
FIG. 18 shows a range of flight control strategies applicable to the motorised devices of the first and second embodiments.

Another advantage of the proposed invention is that parameters relating to wing-beat, wing-stroke and mean flapping angle are independently controllable, with potential benefits for controllability of a two-winged platform. That is, a range of flight control strategies (i.e. hovering, lifting, pitching and rolling), as shown in FIG. 18, are thus applicable to the proposed invention. Flapping frequency directly affects the average lift while rolling torques are generated by asymmetric wing strokes and pitching torques are generated by shifting the wing strokes along the flapping plane by changing the average flapping angle. Hence the proposed invention is able to achieve both longitudinal and lateral-directional controlled flight. For slider crank mechanisms of conventional approaches, only wing-beat frequency can be controlled while wing-stroke and mean flapping angle are fixed. Moreover, in conventional systems, having frequency as the sole controllable parameter leads to disadvantages especially when mechanical resonance is used to boost efficiency. A change in voltage amplitude, for purposes of control, would induce a change in frequency and therefore the system might end up operating out of resonance.

Thus, it is experimentally demonstrated through the present proposed invention that DC motors, in concert with the resilient biasing means 106 (i.e. an elastic mechanism), can be used to directly drive flapping artificial wings 104 at large wing-stroke and at high frequencies. One feature of the proposed invention, being different to conventional approaches, is that the DC motor 102 undergoes a reciprocating (i.e. back and forth) rather than rotary motion. Whenever a reciprocating motion needs to be generated from a DC motor, typical approaches make use of crank-arm mechanisms to turn the motor rotation into wing flapping. Crank arm mechanisms unavoidably introduce nonlinear kinematics, which strongly limits the application of the bio-inspired principle of mechanical resonance as a means of relieving the motor from excessive inertial loading. The use of a direct transmission and of with the resilient biasing means 106 ensures that the sole nonlinearity in the mechanical system described in equation (13) arises only in the aerodynamic damping. Mechanical resonance is still very effective in this type of nonlinear second order system since solutions are 'quasi-sinusoidal' and the condition described in equation (15) implies that inertial and elastic torques balance one another, as in the case of linear systems.

The use of the resilient biasing means 106, tuned to mechanically resonate with the artificial wings 104 and inertia of DC motor 102, will relieve the DC motor 102 from generating the high torques required to accelerate or decelerate the artificial wings 104 and inertia of DC motor 102. The proposed invention focuses on hovering, one of the most power-demanding forms of locomotion and for which the benefits of resonance can be mostly appreciated. Although the proposed principle is general and applicable at all scales, the proposed invention is directed at flyers of about 10 grams heavy, which are comparable in size and weight with small hummingbirds for which a large body of biological observation exists. As such, the specifications of the proposed invention pertain to flapping frequencies configured for the artificial wings 104 in the range of 20 Hz to 40 Hz, and wing-strokes as large as ±60 degrees.

In fact, besides mechanical resonance, 'quasi-sinusoidal' motion is the second important lesson learned from biology. The method based on 'quick estimates', as previously proposed in related art to analyse the fitness to fly of several species, was readapted to DC motors, generalizing the maximum power transfer theorem to nonlinear systems at quasi-sinusoidal regime. The aerodynamic damping of a given wing, at a given desired kinematics, is captured by the amplitude of the angular velocity $\Omega_0$, as defined in equation (9), and can be represented as an equivalent impedance $R_{mech}$ in the electrical domain, defined as in equation (20). The DC motor is then selected by matching its armature resistance directly with the equivalent wing impedance.

Also, a prototype based on the proposed invention for proof-of-concept is developed. The selected DC motor 102 was in fact able to drive the given artificial wing at the desired kinematics, keeping well within the rated limits. The same task was clearly impossible when the resilient biasing means 106 is removed, as shown in FIG. 15. Although the proposed invention is directed at miniature flying robots, the same concepts can be potentially extended to other applications where cyclic motions are important, such as running, swimming, hopping robots. That is, the at least one limb 104 may then be realised as corresponding legs, fins, flippers and the like.

Potential applications of the proposed invention include related civil, military-defence and security applications. It will be appreciated that micro aerial vehicles (MAVs), of which the proposed invention belongs to, are increasingly gaining immense interest from both aerospace engineers and biologists studying animal flight. Such MAVS are of special interest due to many promising civil and military applications as mentioned, for example inspection of buildings and other structures, or silent and inconspicuous surveillance etc. Further, a formation of the proposed motorised device 100, 1600 may flexibly be equipped with diversified micro-sensors ranging from multiple microphones and cameras to gas detectors, allowing for a range of different missions to be performed as desired.

The described embodiments should not however be construed as limitative. For example, the computing device 1650, and the camera 1652 of the second embodiment may also be used in conjunction with the motorised device 100 of the first embodiment (depicted in FIG. 1).

While the invention has been illustrated and described in detail in the drawings and foregoing description, such illustration and description are to be considered illustrative or exemplary, and not restrictive; the invention is not limited to the disclosed embodiments. Other variations to the disclosed embodiments can be understood and effected by those skilled in the art in practising the claimed invention.

The invention claimed is:

1. A motorized device arranged to move using cyclic motion, the device comprising:
   at least two DC motors;
   at least one limb coupled to the at least two DC motors, and configured to be driven by the at least two DC motors for moving the device; and
   a resilient biaser coupled to the at least one limb and configured to further drive the at least one limb using mechanical resonance configured to occur at a flapping frequency of the at least one limb.

2. The device of claim 1, further comprising a micro aerial device.

3. The device of claim 2, wherein the at least one limb includes two wings cooperatively configured for flapping to generate lift.

4. The device of claim 3, wherein the two wings are in a coplanar arrangement.

5. The device of claim 4, wherein the two wings are arranged in respective planes.

6. The device of claim 2, wherein the at least one limb includes two pairs of wings cooperatively configured for flapping to generate lift, each pair of wings being in a respective coplanar arrangement and configured to be independently driven by a corresponding of the at least two DC motors.

7. The device of claim 3, wherein the wings are configured to flap at a frequency range of between approximately 20 Hz to 40 Hz.

8. The device of claim 3, wherein each wing is configured to have a maximum wing stroke of approximately ±60 degrees.

9. The device of claim 1, wherein the resilient biaser is selected from at least one of: helical spring, nylon string and torsion spring.

10. The device of claim 1, further comprising a computer in wireless communication with the motorized device, wherein the computer is configured to provide motion-tracking and real-time stabilization/control commands to the motorized device.

11. The device of claim 1, wherein the resistive impedance of the at least two DC motors is matched with the mechanical resistance generated by the at least one limb.

12. The device of claim 1, wherein the at least two DC motors are configured to be collectively operable using a single driver.

13. The device of claim 1, wherein the at least two DC motors are configured to be independently operable using respective drivers to enable different limb kinematics.

14. A micro aerial device arranged to move using cyclic motion, the device comprising:
  at least two DC motors;
  at least one fin coupled to the at least two DC motors, and configured to be driven by the at least two DC motors for moving the device; and
  a resilient biaser coupled to the at least one fin and configured to further drive the at least one fin using mechanical resonance configured to occur at a flapping frequency of the at least one limb.

15. A method of moving a motorized device using cyclic motion, the device including at least two DC motors, at least one limb coupled to the at least two DC motors, and a resilient biaser coupled to the at least one limb, the method comprising:
  driving the at least one limb using the at least two DC motors to move the device; and
  further driving the at least one limb using mechanical resonance of the resilient biaser occurring at a flapping frequency of the at least one limb.

16. The device of claim 6, wherein the wings are configured to flap at a frequency range of between approximately 20 Hz to 40 Hz.

17. The device of claim 6, wherein each wing is configured to have a maximum wing stroke of approximately ±60 degrees.

* * * * *